US006977754B2

(12) United States Patent
Matsumoto et al.

(10) Patent No.: US 6,977,754 B2
(45) Date of Patent: Dec. 20, 2005

(54) IMAGE PROCESSING APPARATUS, AN IMAGE PROCESSING METHOD AND COMPUTER PROGRAM PRODUCT FOR COMBINING PAGE DESCRIPTION LANGUAGE IMAGE DATA AND BITMAP IMAGE DATA

(75) Inventors: Atsushi Matsumoto, Tokyo (JP); Shinichi Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 933 days.

(21) Appl. No.: 09/878,943

(22) Filed: Jun. 13, 2001

(65) Prior Publication Data
US 2002/0003633 A1   Jan. 10, 2002

(30) Foreign Application Priority Data
Jun. 15, 2000  (JP) .............................. 2000-179719

(51) Int. Cl.[7] ............................................. G06K 15/00
(52) U.S. Cl. ...................... 358/1.9; 358/2.1; 358/1.16
(58) Field of Search .......................... 358/1.1, 1.9, 2.1, 358/1.16, 1.17, 1.18, 450, 462

(56) References Cited
U.S. PATENT DOCUMENTS
5,465,165 A * 11/1995 Tanio et al. ................ 358/448

| | | | |
|---|---|---|---|
| 5,659,770 A * | 8/1997 | Yamada | 715/530 |
| 6,256,104 B1 * | 7/2001 | Rumph et al. | 358/1.15 |
| 6,385,348 B1 * | 5/2002 | Harada | 382/284 |
| 6,429,950 B1 * | 8/2002 | Ebner | 358/1.9 |

* cited by examiner

Primary Examiner—Thomas D. Lee
(74) Attorney, Agent, or Firm—Fitzpatrick, Cella, Harper & Scinto

(57) ABSTRACT

One particular object of the present invention is to facilitate high quality reproduction for an image combining an image based on rendered PDL commands and a scanned image without considering whether the processed pixel is a portion of the scanned image or a portion of the image base on rendered PDL commands. So the present invention relates to an image processing apparatus which include an inputting unit for inputting image data described by a command corresponding to each part of an image, an interpreting unit for interpreting the command to form a bitmap image and to output attribute information; a scanning unit for scanning an image to output color image data; a generating unit for generating flag data indicating attributions of the image based on the color image data and indicating the pixel preferring the same image process as the pixel based on the attribute information; a first combining unit for combining the color image data and the bitmap image; and a second combining unit for combining the flag data and the attribute information of the command.

36 Claims, 15 Drawing Sheets

FIG.3
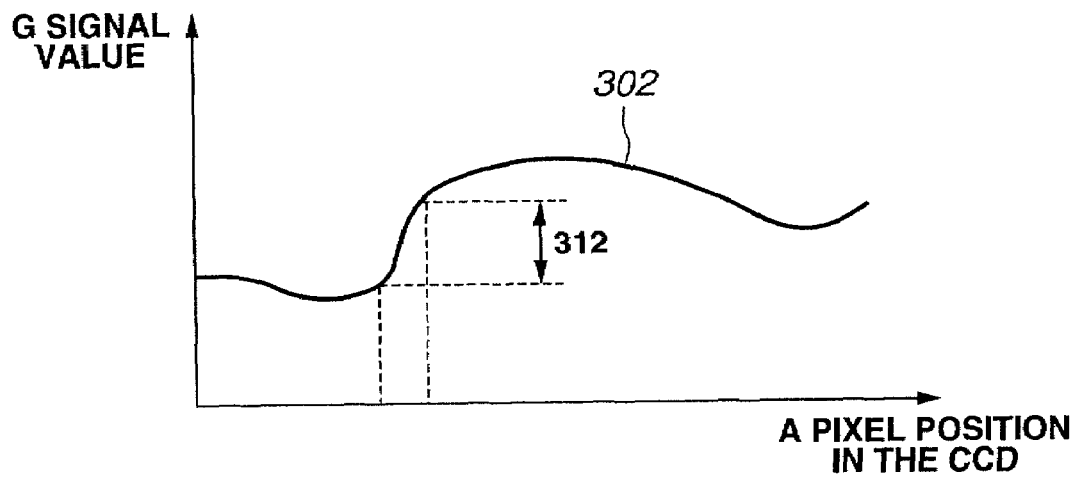
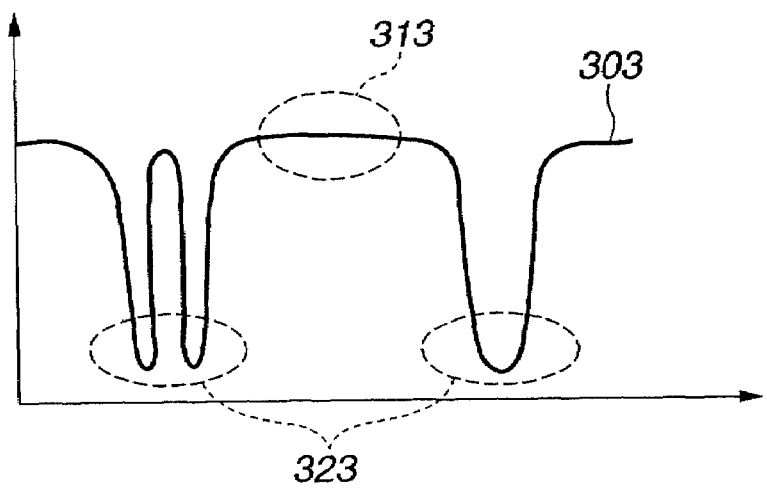
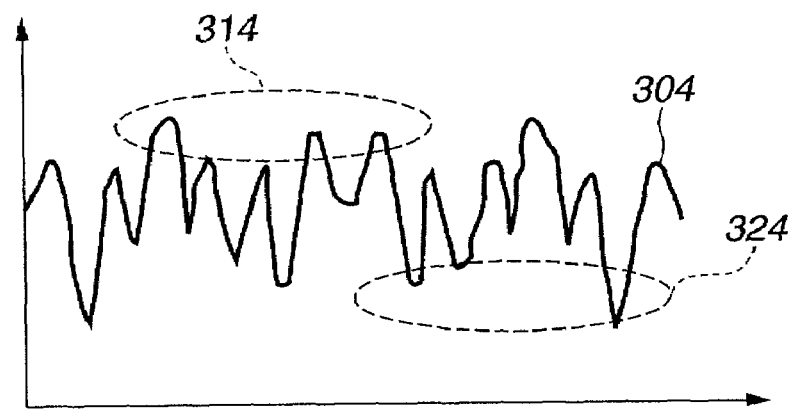

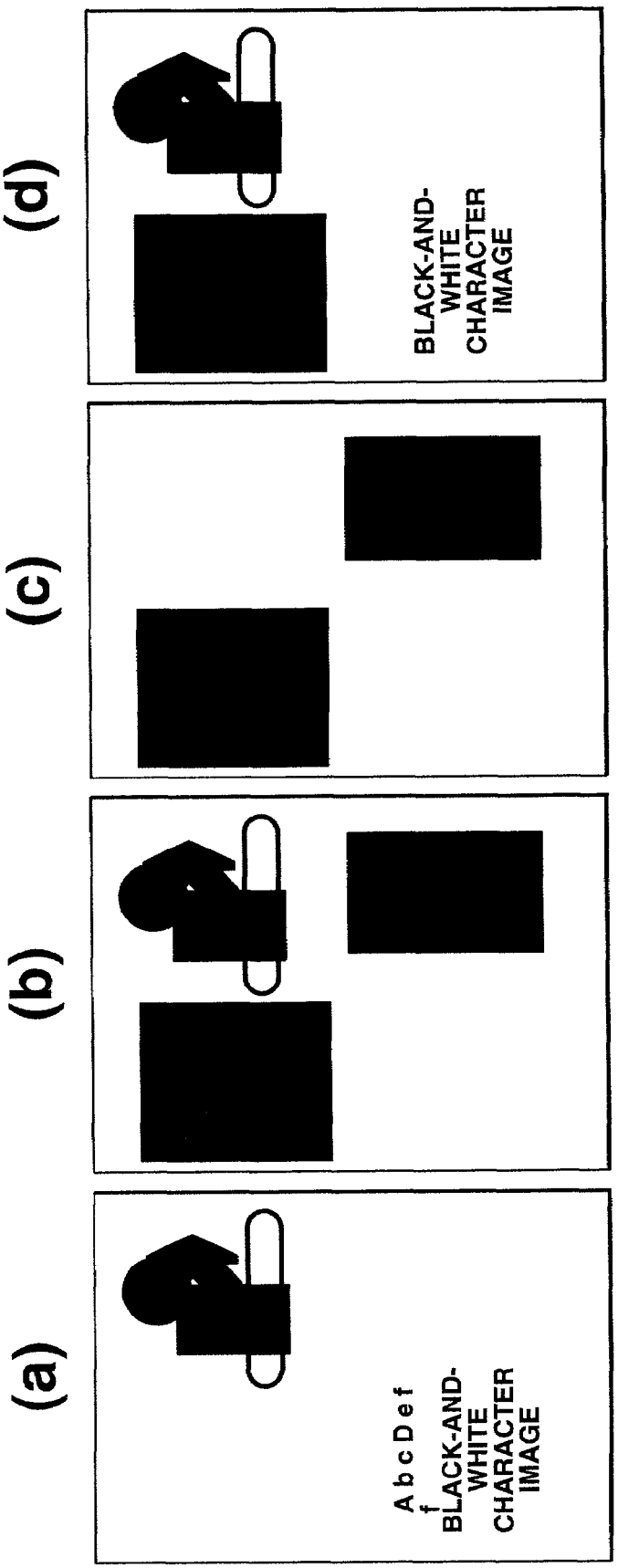

IMAGE PROCESSING APPARATUS, AN IMAGE PROCESSING METHOD AND COMPUTER PROGRAM PRODUCT FOR COMBINING PAGE DESCRIPTION LANGUAGE IMAGE DATA AND BITMAP IMAGE DATA

BACKGROUND OF THE INVENTION

1. Field of the Invention

This invention relates to an image processing apparatus, an image processing method and computer program product for combining PDL (page description language) image data and bitmap image data.

2. Description of the Related Art

Recent image forming apparatuses include functionality of both a copier and a printer. The apparatus is able to form images by scanning an original to obtain pixel-based image data directly (like a copier) and is also able to form images by interpreting commands in a page description language ("PDL") so as to render the PDL commands into pixel-based image data (like a printer). PDL commands are not pixel-based images, whereas an image based on rendered PDL commands is a pixel-based image.

Such apparatuses are also able to form combined images, where part of a single printed image is obtained from scanning and another part is obtained from rendered PDL commands. The following is a discussion related to high quality reproduction for a combined image including a scanned image and an image based on rendered PDL commands. High quality reproduction processing for a combined image can be realized by changing color converting method RGB to YMCK, gamma correction method or binarization method. Preferably, processing is eased by processing the combined image without considering whether the processed pixel is a portion of a scanned image or a portion of an imaged based on rendered PDL commands.

As an example of high quality reproduction processing, copying machines have a special process for black characters which detects black characters portions in a scanned image and reproduces the detected black character portion by just black ink without using yellow ink, cyan ink, magenta ink. Detection of black characters must be performed on a pixel based image (a scanned image or a bitmap image) since in the detection of black characters, it is necessary to compare a pixel with its surrounding pixels. A printer interpreter renders PDL commands received via an interface as a bitmap image and prints the bitmap image. After rendering the PDL commands, the bitmap image is a pixel-based image just like the scanned image so detection of black character can be performed for the bitmap image. Then, the reproducing process for black characters can be performed to a portion of the image base on rendered PDL commands exactly the same as a portion of the scanned image. As a result, the reproducing process for black character can be performed without considering whether the processed pixel is a portion of the scanned image or a portion of the image based on rendered PDL commands.

However, since the detecting of black characters is a conjecture that the processed pixel is a part of a black character by comparing the processed pixel with its surrounding pixels, the detection results are not necessarily correct. If the process for black characters is performed based on the wrong detection result, the reproduced image is degraded.

Attributes of an image based on PDL commands can be detected perfectly by discriminating the kind of the PDL commands even without rendering PDL commands. The attributes discriminated from the PDL commands indicate whether the image portions based on the PDL commands are graphic portions, natural image portions or character portions. The attributes of the graphic portions, the nature portions or the character portions are different from definition based on the detecting of the black character in copying machines. The attributes and the definition of the detecting black character can not be used together without considering whether the processed pixel is a portion of the scanned image or a portion of an image based on PDL commands.

SUMMARY OF THE INVENTION

An object of the present invention is to address the foregoing problems.

One particular object of the present invention is to facilitate high quality reproduction for an image combining an image base on rendered PDL commands and an scanned image without considering whether the processed pixel is a portion of the scanned image or a portion of the image based on rendered PDL commands.

According to one aspect, the present invention, which achieves these objectives, relates to an image processing apparatus comprising, inputting means for inputting image data described by a command corresponding to each part of an image, interpreting means for interpreting the command to form a bitmap image and to output attribute information; scanning means for scanning an image to output color image data; generating means for generating flag data indicating attributes of the image based on the color image data and indicating the pixel preferring the same image process as the pixel based on the attribute information; first combining means for combining the color image data and the bitmap image; and second combining means for combining the flag data and the attribute information of the command.

According to another aspect, the present invention, which achieves these objectives, relates to an image processing method comprising, inputting image data described by a command corresponding to each part of an image, interpreting the command to form a bitmap image and to output attribute information; scanning an image to output color image data; generating flag data indicating attributes of the image based on the color image data and indicating the pixel preferring the same image process as the pixel based on the attribute information; combining the color image data and the bitmap image; and combining the flag data and the attribute information of the command.

According to another aspect, the present invention, which achieves these objectives, relates to a computer program product, comprising a computer readable medium having computer program codes, said product including, code for inputting image data described by a command corresponding to each part of an image, code for interpreting the command to form a bitmap image and to output attribute information; code for scanning an image to output color image data; code for generating flag data indicating attributes of the image based on the color image data and indicating the pixel preferring the same image process as the pixel based on the attribute information; code for combining the color image data and the bitmap image; and code for combining the flag data and the attribute information of the command.

According to another aspect, the present invention, which achieves these objectives, relates to an image processing apparatus comprising an interface unit arranged to input image data described by a command correspond to each part of an image, an interpreting unit arranged to interpret the command to form a bitmap image and to output attributes information; a scanner unit arranged to scan an image to output color image data; a generating unit arranged to generate flag data indicating attributes of the image based on the color image data and indicating the pixel preferring the same image process as the pixel based on the attribute information; a first combine unit arranged to combine the color image data and the bitmap image; and a second combine unit arranged to combine the flag data and the attribute information of the command.

One advantage of the present invention is the facilitation of high quality reproduction for an image combining an image base on rendered PDL commands and an scanned image without considering whether the processed pixel is a portion of the scanned image or a portion of the image base on rendered PDL commands. That is, because attribute information from interpreted PDL commands is combined with flag information generated from pixel-based data, attributes of each portion of a combined image can be ascertained without requiring knowledge of the image source for each portion.

According to another aspect, the present invention, which achieves these objectives, relates to an image processing apparatus comprising, data inputting means for inputting image data through a command interface and described by a command correspond to each part of an image, interpreting means for interpreting the command to form a bitmap image and to output attribute information; scanning means for scanning an original image as digital signals pixel by pixel; storing means for storing the scanned digital signals; area discriminating means for discriminating areas based on characters of the original image; feature data storing means for storing attribute flag data, indicating attributes of the image based on the scanned digital signal and indicating the pixel preferring the same image process as the pixel based on the attribute information, discriminated by the area discriminating means corresponding to the scanned digital signals pixel by pixel; wherein the bitmap image is combined with the scanned digital signal on the image storing means; and the attribute information of the command is also combined with the attribute flag data on the feature data storing means.

Other objects and advantages of the present invention will become apparent from the detailed description to follow taken in conjunction with the appended claims.

BRIEF DESCRIPTION OF THE DRAWINGS

FIG. 3 is a diagram for explaining an example of an image area dividing process.

FIG. 15 is a diagram for explaining combining the attribute information with the attribute flag data and adding PDL image flag.

DETAILED DESCRIPTION OF THE PREFERRED EMBODIMENTS

[First Embodiment]

The following is an embodiment of this invention is explained using drawings.

Figure 10:
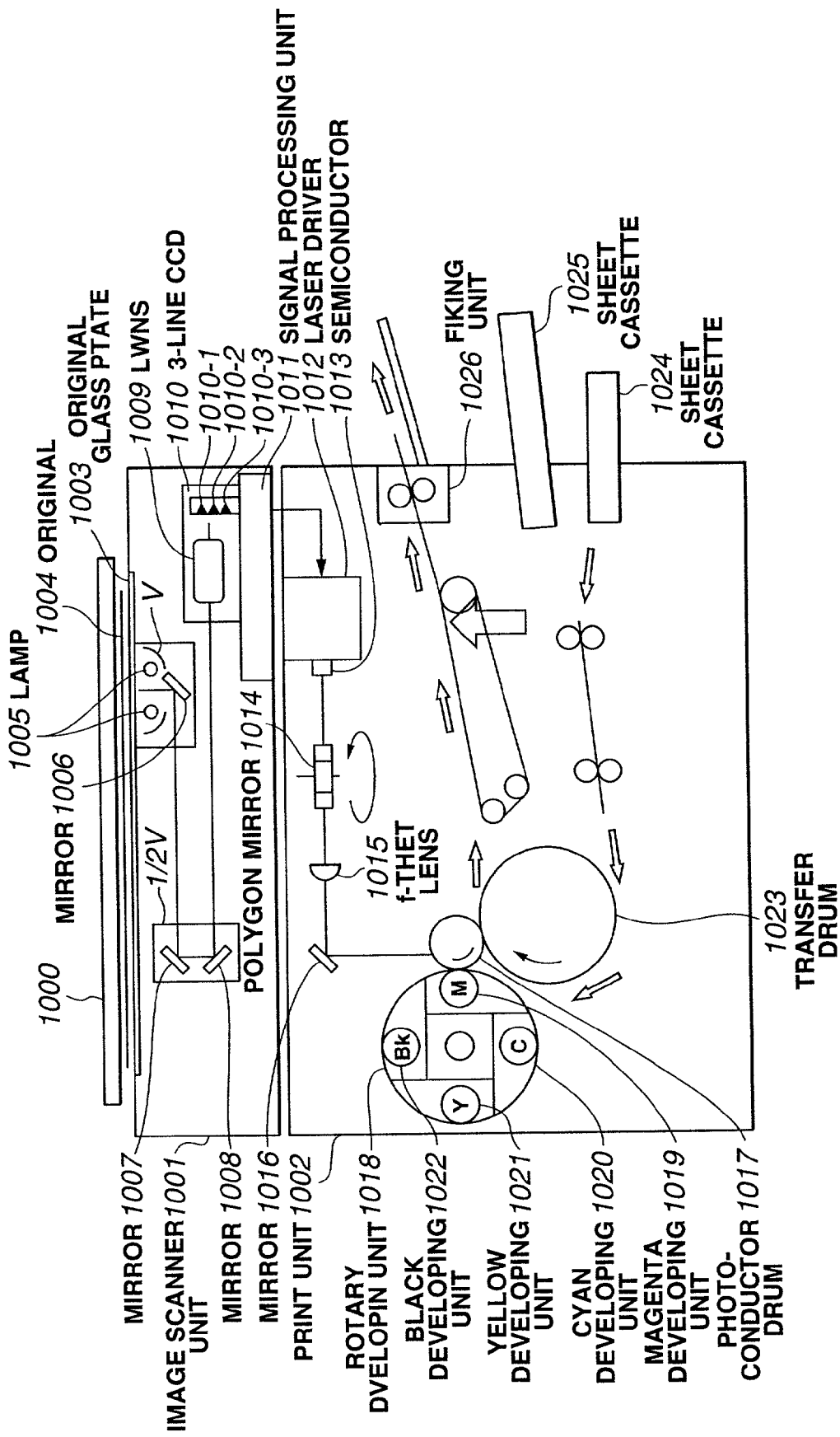
FIG. 10 is a diagram showing an example of an image forming apparatus in the first embodiment.

FIG. 10 is a diagram showing an example of an image forming apparatus of the first embodiment. Image scanner unit 1001 in FIG. 10 reads an original and processes digital signals. Printer unit 1002 is a unit printing a full-color image correspond to the read image on a sheet.

As shown in FIG. 10, the copying machine has mirror surface pressing plate 1000. Original 1004 on original glass plate 1003 is illuminated by lamp 1005. The reflected light is reflected and guided by mirrors 1006 to 1008. An image of the reflected light is formed on 3-line CCD (Charge Coupled Device) 1010 through the lens 1009. Three image signals comprised R (red), G (green), and B (blue) are sent to signal processing unit 1011 as full-color information. Lamp 1005 and mirror 1006 are mechanically moved at a velocity v and the mirror 1007 and 1008 is moved at a velocity (½)v to a vertical direction (a sub-scan direction) for electrical scan direction (main-scan direction) of 3-line CCD to scan the entire surface of original 1004. Original 1004 is scanned by a specific resolution (e.g., main-scan direction 400 dpi (dot/inch), sub-scan direction 400 dpi (dot/inch)).

Signal processing unit 1011 processes the scanned image signals electrically and decomposes them to M (magenta), C (cyan), Y (yellow) and Bk (black) color component signals, and sends them to the printer unit 1002. Signal processing unit 1011 generates four signals (Y, M, C and Bk) from three plane signals (R, G and B) obtained by one scanning of original 1004. And then, one of M, C, Y and Bk components is sent to printer unit 1002 in this embodiment's printer. One print operation is completed by four transmissions of the four image signals (Y M C and Bk).

Each M, C, Y and Bk image signal sent from image scanner unit 1001 are sent to laser driver 1012 which modulates semiconductor laser 1013 in accordance with the image signal of the respective colors. The laser beam scans on photo-conductor drum 1017 through a polygon mirror 1014, an f-theta lens 1015 and a mirror 1016. Photo-conductor drum 1017 is scanned by a specific resolution (e.g., main-direction 400 dpi, sub-direction 400 dpi).

Rotary developing unit 1018 comprises magenta developing unit 1019, cyan developing unit 1020, yellow developing unit 1021 and black developing unit 1022. The four developing units alternately contact photo-conductor drum 1017 to develop M, C, Y and Bk electrostatic latent image formed on the photo-conductor drum 1017 by corresponding toners.

Transfer drum 1023 around which a sheet fed from sheet cassette 1024 or 1025 is wrapped so that the toner image developed on the photo-conductor drum 1017 is transferred to the sheet. In this manner, the M, C, Y and Bk colors are sequentially transferred and the sheet is ejected through fixing unit 1026.

The copy apparatus of this embodiment prints an image by using one photo-sensitive drum and rotating rotary developing unit 1018 four times. However, the copy apparatus may form each Y, M, C and Bk image on each four photo-sensitive drams synchronized with image formation.

Figure 1:
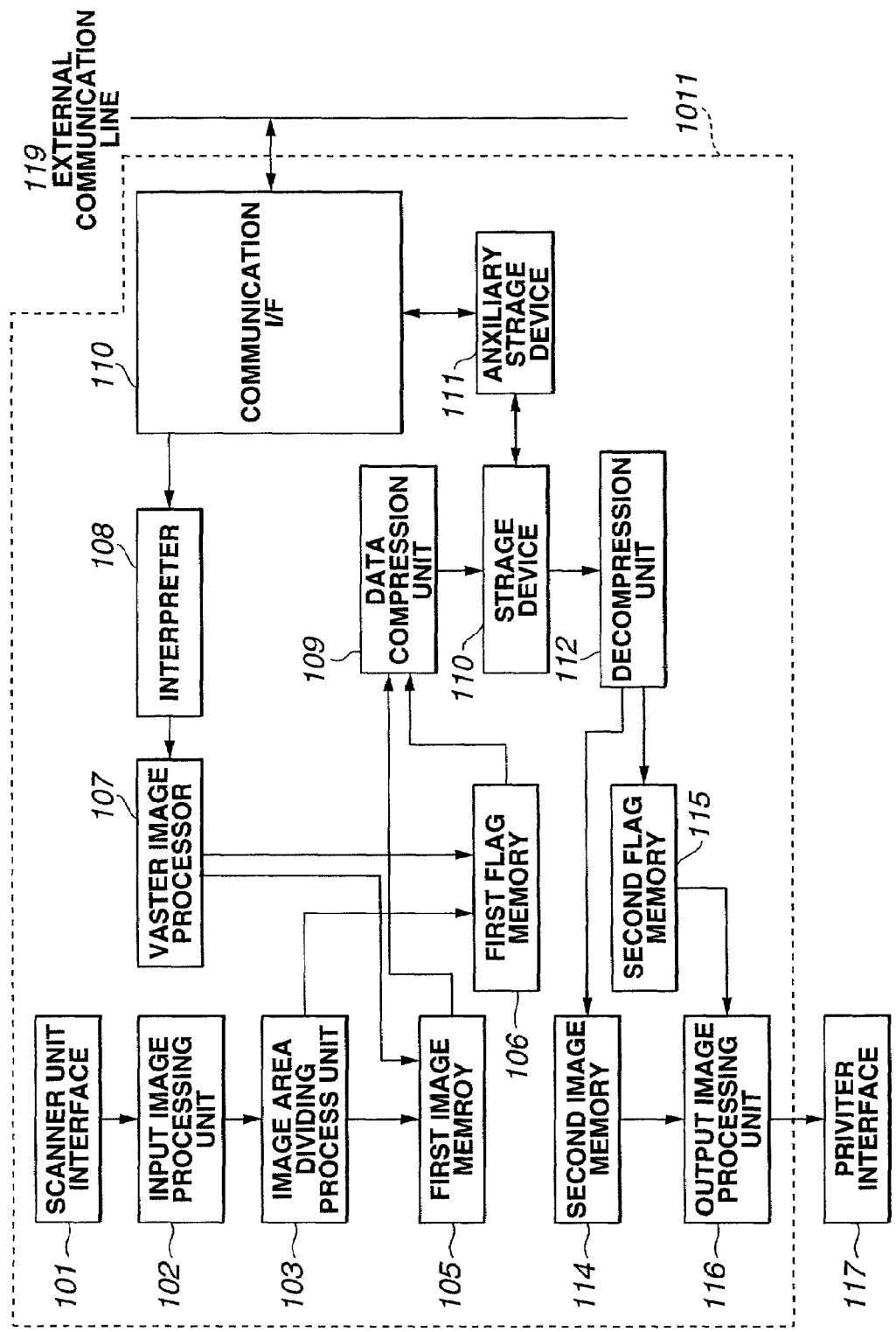
FIG. 1 is a block diagram which shows a schematic construction of this invention.

FIG. 1 is a block diagram showing an example for explaining this embodiment drawing signal processing unit 1011 more detail. Signal processing unit 1011 comprises scanner unit interface 102, input image processing unit 103, first image memory 105, first flag memory 106, raster image processor 107, interpreter 108, data compression unit 109, storage device 110, auxiliary storage device 111, decompression unit 112, second image memory 114, second flag memory 115, output image processing unit 116, printer interface 117 and communication I/F118.

Original 1004 is put on original glass plate 1003 of scanner unit interface 101 and is scanned. Scanner unit interface 101 receives pixel by pixel digital data from scanner unit 1001 by using 3-line CCD and sends color image data to image processing unit 102. Input image processing unit 102 performs well-known image processing like shading compensation, CCD inter-line correction and color correction etc. Image area dividing process unit 103 performs image area dividing process to the image processed color image signals which are outputted from input image processing unit 102. Image area dividing processing unit 103 detects features of the image such as photograph area, character area and half tone dot area or the like for every pixel of the image, based on surrounding pixels, and generates attribute flag data indicating of attributes of each image area.

[Image Area Dividing Process]

The following describes image area dividing process unit 103 in detail. An image area division process is performed for extracting features of an original image in order to perform optimum image processes in accordance with the features of the original image and generating signals showing image area attributes (hereinafter, such that signals are referred to as attribute flag data). For example, there are various image areas such as full color photograph area of continuous gradation, character area of monochromatic color of black, halftone dots print area like a newspaper print, and like in the original image. If those image areas are uniformly processed by a same image processing procedure and resultant data is outputted, good picture quality cannot be obtained in many cases. Therefore, image area dividing process unit 103 detects attributes of image data including in the original image by using color image signals inputted from input image processing unit 102 and generates attribute flag data indicating the result of the detecting.

Figure 2:
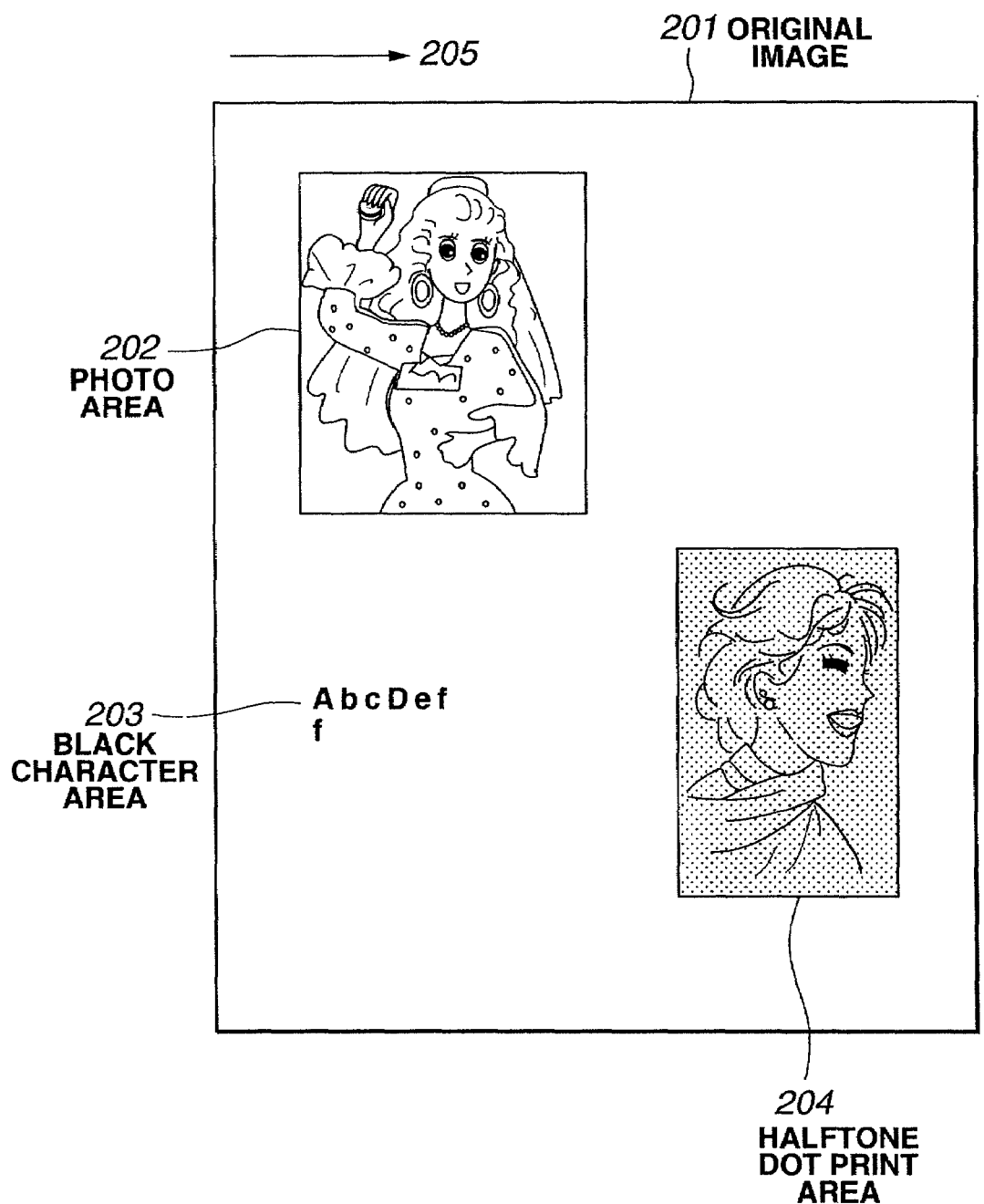
FIG. 2 is a diagram showing an example of an original image.

FIG. 2 shows an example of original image 201 which has photo area 202, black character area 203 and half tone dots print area 204. Scanner unit 1001 in FIG. 1 scans the original image 201 by color CCD sensors and obtains color digital signals (R, G, B) for each pixel. The obtained color image signals (R, G, B) have features depending on attributes of image areas. FIG. 3 is a example of G signal values among the scanned color digital signals (R, G, B) in each area (202, 203 and 204). The G signal values are plotted in order of the pixels arranging direction of the CCD (in the direction of arrow 205) for the each area in FIG. 3. Reference numerals 302, 303 and 304 denote examples of features which characteristically appear in the case where the areas 202 to 204 are scanned. An abscissa axis denotes a pixel position in the CCD and a vertical axis denotes the scanned signal value. The nearer the scanned value approaches the maximum score, the nearer the color of the pixel position approaches white (bright).

The following is an explanation of feature about each area in FIG. 2. A change of the scanned value 302 is relatively gentle and a difference 312 between two short distance pixel values is small in photo area 202. Reference numeral 303 denotes the characteristics of black character area 203. Since black character are written on a white background in black character area 203, the scanned value shows characters such that it suddenly changes from a white background portion 313 (white) to a character portion 323 (black). Reference numeral 303 denotes the characteristics of halftone dots print area 204. Since halftone dots area appears the white background 313 and halftone dots 324 printed thereon continuously, the scanned value shows characters such that white and black appear continuously and with high frequency.

For discriminating the above attributes, it is sufficient to detect the features of each area as described above from the scanned signal values and discriminate them. For this purpose, it is possible to use a well-known feature extracting method based on a change amount of the image data near a target pixel, an accumulation value of the change amount in the predetermined interval, a luminance value (white background or color background) of peripheral pixels, the number of times of change from white to black of the image data in a predetermined interval, or the like, and to use a well-known attribute discriminating method based on the feature extracting method.

Figure 4:
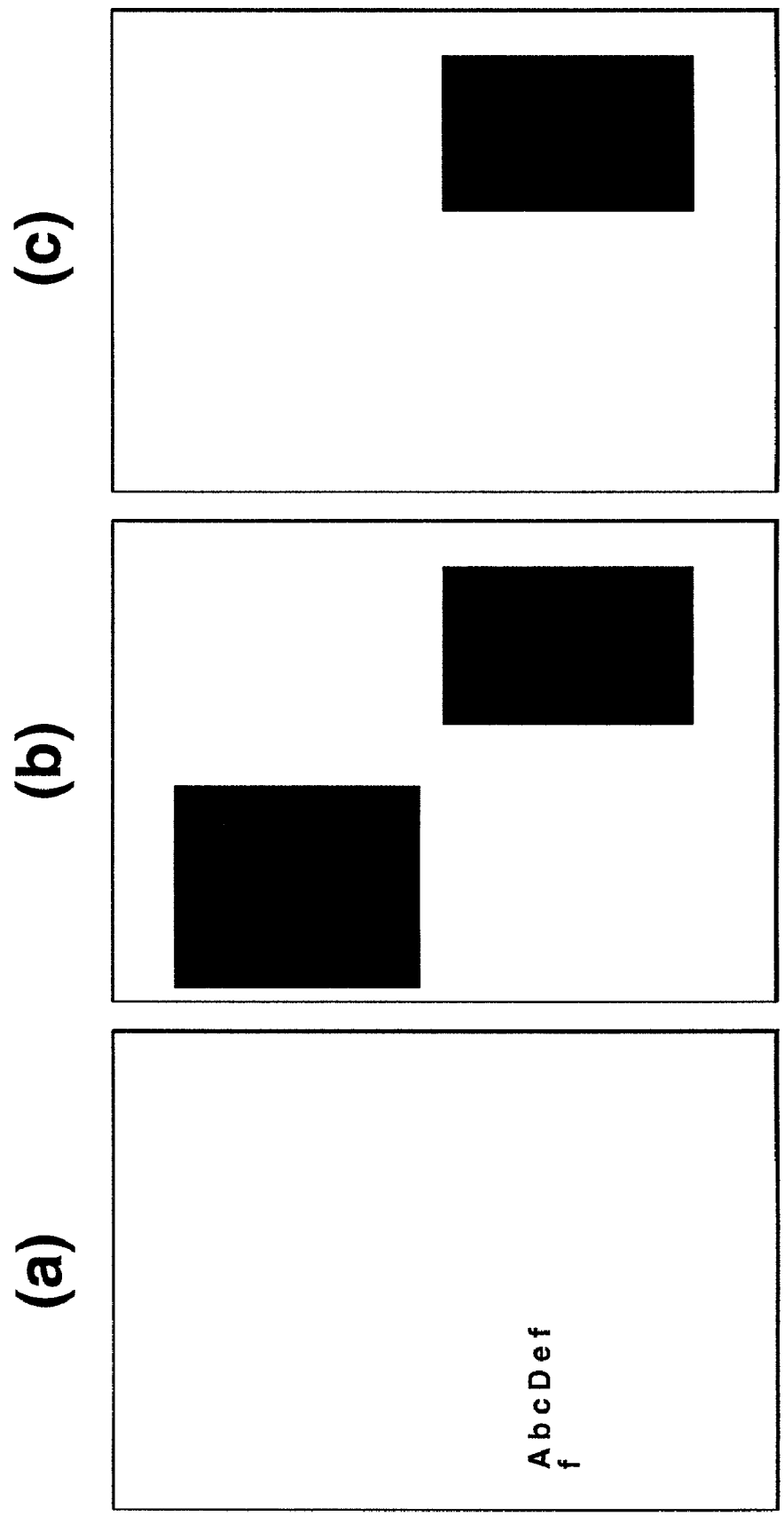
FIG. 4 is a diagram for explaining attribute flag data representing features of a scanned image.

FIGS. 4(a) to 4(c) show an example of attribute flag data formed for the original image of FIG. 2 as mentioned above. Although three kinds of flags of a character flag (1 bit for each pixel), a color flag (1 bit for each pixel) and a halftone dots flag (1 bit for each pixel) are formed here as attribute flag data, this embodiment is not limited to them. FIG. 4(a) shows the character flag. Pixels shown in black in FIG. 4(a) are pixels having character attribute (then the character flag="1"). A white portion in FIG. 4(a) indicates the other area (then the character flag="0"). FIG. 4(b) shows the color flag. The color flags are set to "1" in a color area and are set to "0" in the other area. FIG. 4(c) shows the halftone dots flag. The halftone dots flag are set to "1" in a halftone dot area and are set to "0" in the other area.

The image data scanned by scanner unit 101 and the attribute flag data generated by the above-mentioned image process procedure are temporally stored in first image memory 105 for storing the image data and first flag memory 106 for storing the flag data.

[PDL Image Data Combining Process]

Command data such as PDL commands expressed by a set of commands corresponding to parts of an image are inputted from communication interface (I/F) 118 through external communication path 119. Interpreter 108 interprets the set of commands and outputs an intermediate language for rendering a bitmap image. Raster Image Processor (RIP) 107 renders the bitmap image by using the intermediate language in first image memory 105. Image data scanned by scanner 1001 has already been stored in first image memory 105. The bitmap image is combined with the image data by using a predetermined method such as a method selected by the user.

The bitmap image rendered by RIP 107 is overwritten on first image memory 105 storing the scanned image data in this embodiment. Furthermore, RIP 107 generates attribute information from attributes of the set of commands and renders the attribute information on first flag memory 106. Since image data of the bitmap image is combined to the image data stored on first image memory 105 by overwriting the bitmap image, the attribute information is also overwritten on the attribute flag data stored first flag memory 106 pixel by pixel in this embodiment. When the attribute information is combined, the attribute information is combined with the attribution flag data by using the same method to combine the scanned image data with the bitmap image data. Feature information (the attribute flag data and the attribute information) corresponding to features of each pixel of the combined image data is thus stored in first flag memory 106.

Figure 5:
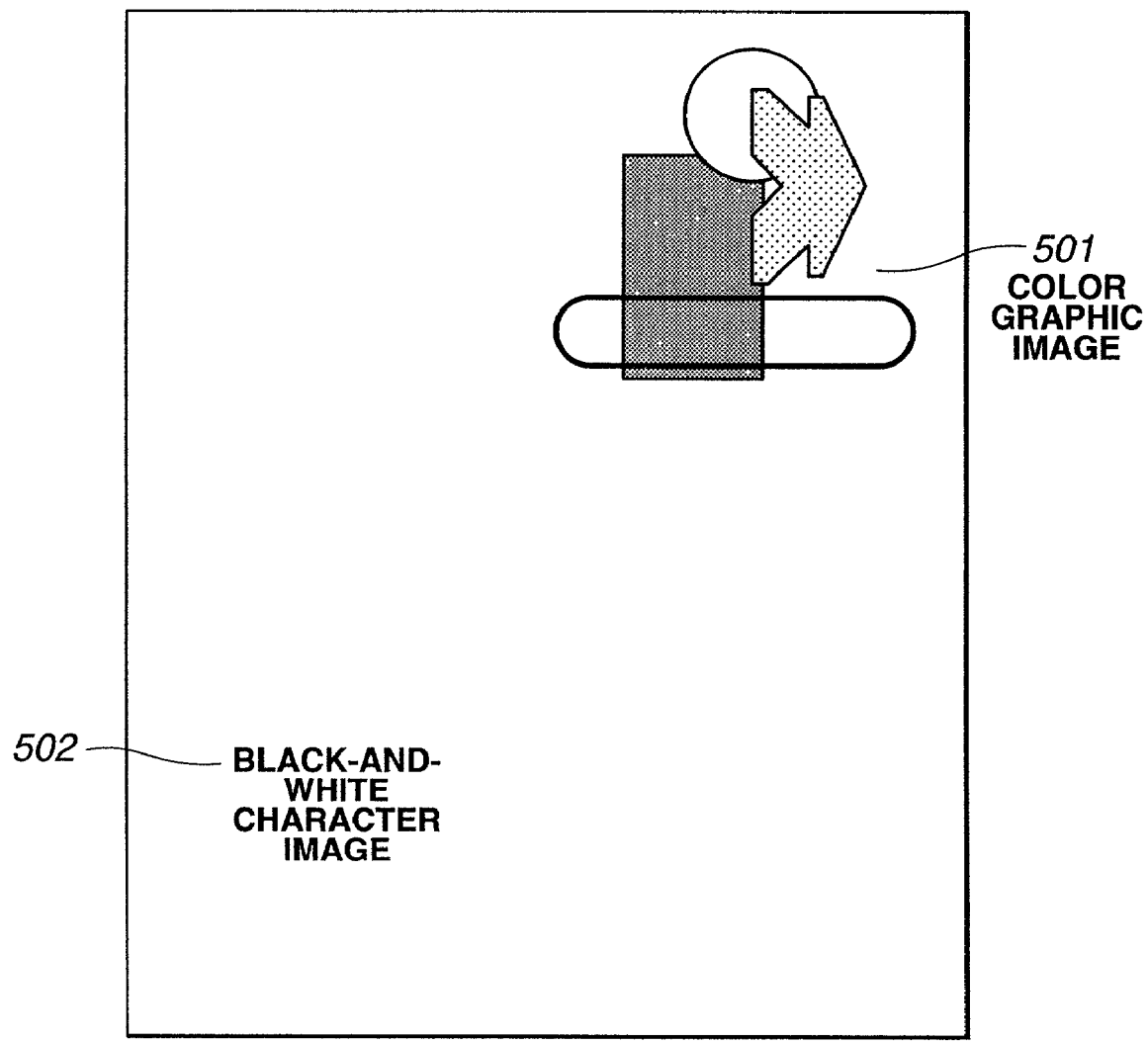
FIG. 5 is an example of PDL image data applied to the first embodiment.
Figure 7:
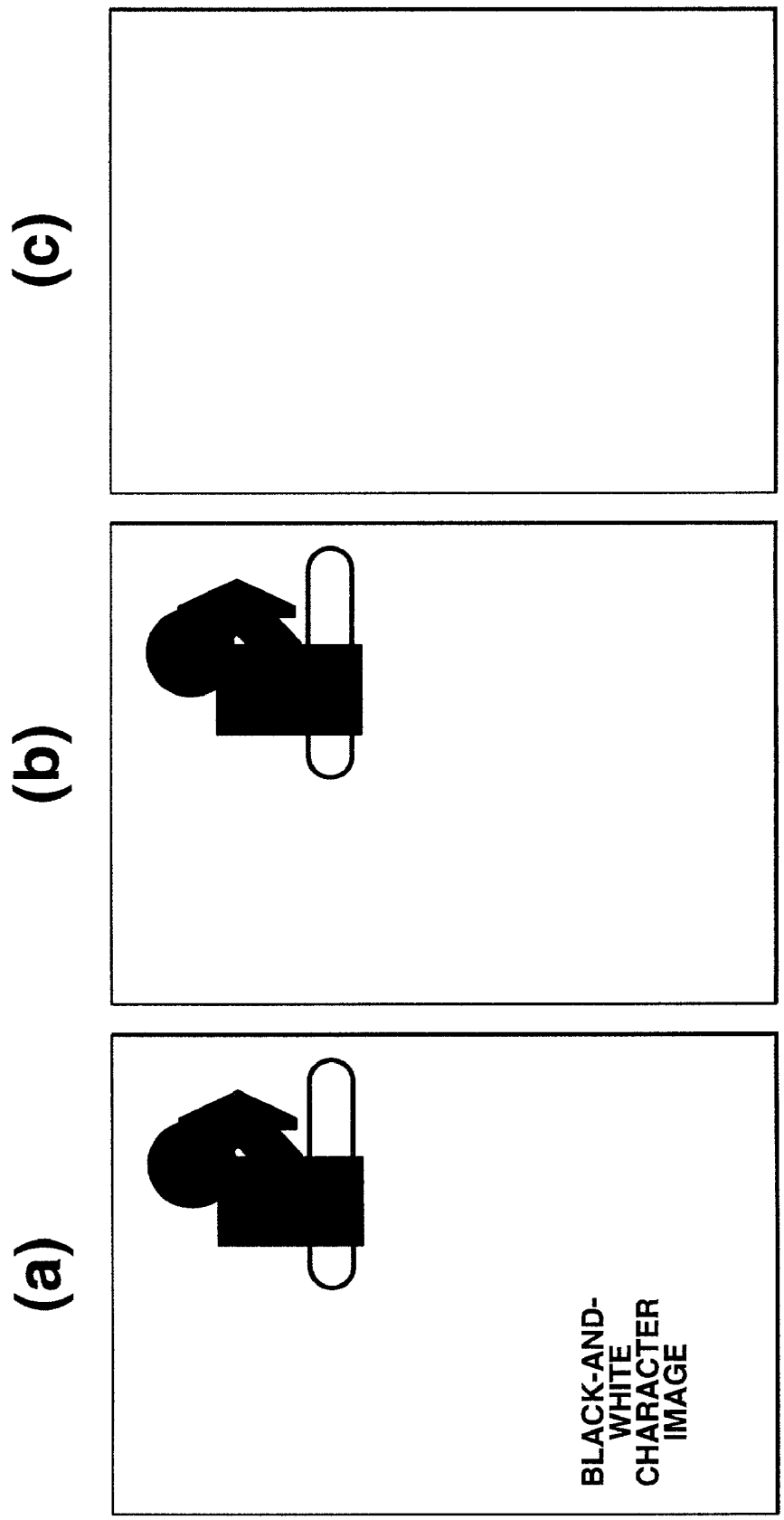
FIG. 7 is a diagram for explaining of attribute information of PDL image in the first embodiment.
Figure 8:
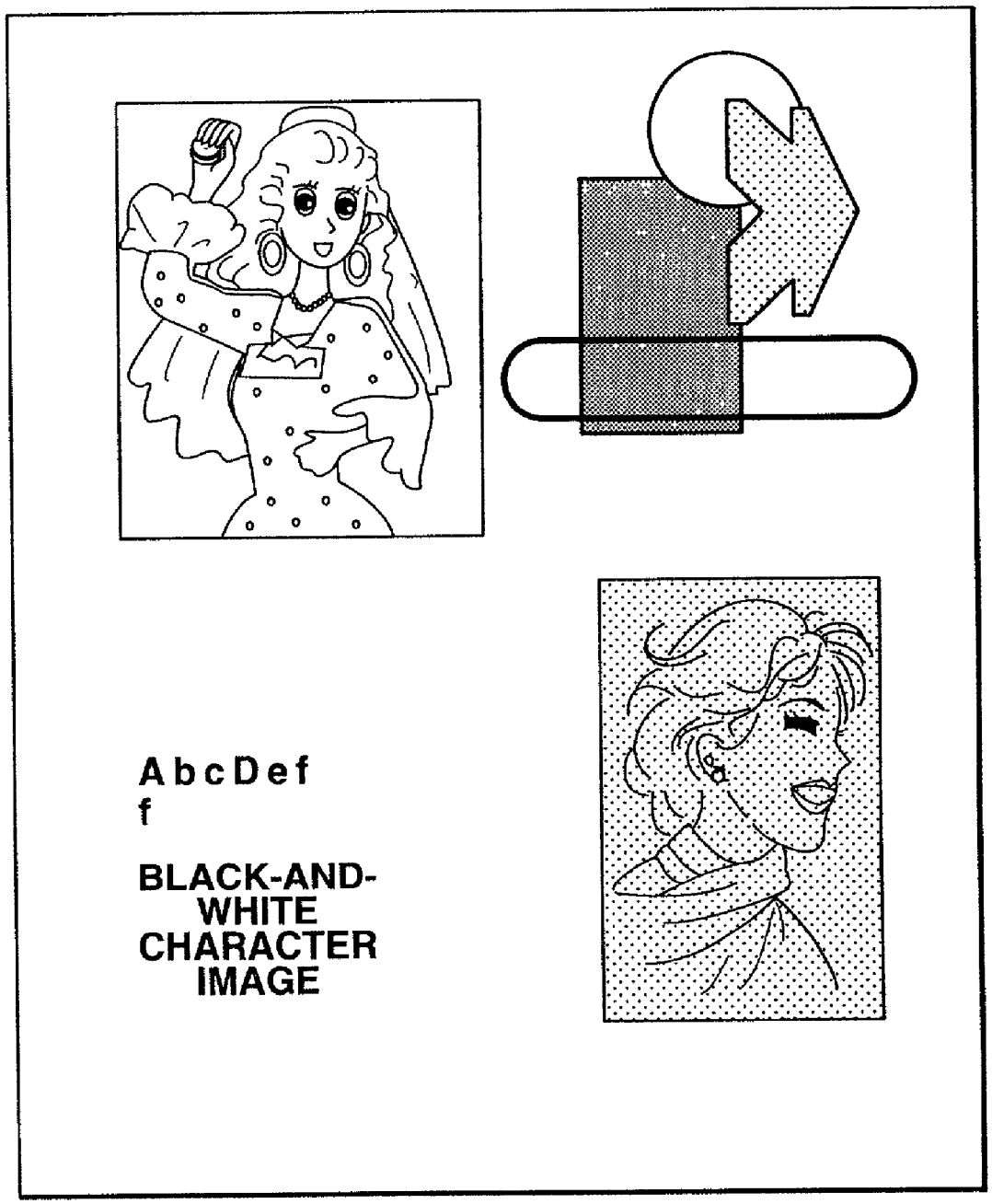
FIG. 8 is a diagram for explaining of an output image in the first embodiment.

FIG. 5 is a diagram showing an example for explaining the inputted PDL image data. 501 is a color graphic image and 502 is a black-and-white character image. FIG. 8 shows a combined image. The feature information is generated like FIG. 7. FIG. 7(a) shows graphic attributes. FIG. 7(b) shows color attributes. A back area in FIG. 7(b) indicates color area. Since 502 is black character image and not a color area, the black-and-white character area is not shown in FIG. 7(b). FIG. 7(c) is a diagram showing natural image attributes, based on the bitmap image data, having already been rendered except for the character attributes and the graphic attributes. Since there is not a natural image, in FIG. 5, all natural image attributes are "0".

Figure 9:
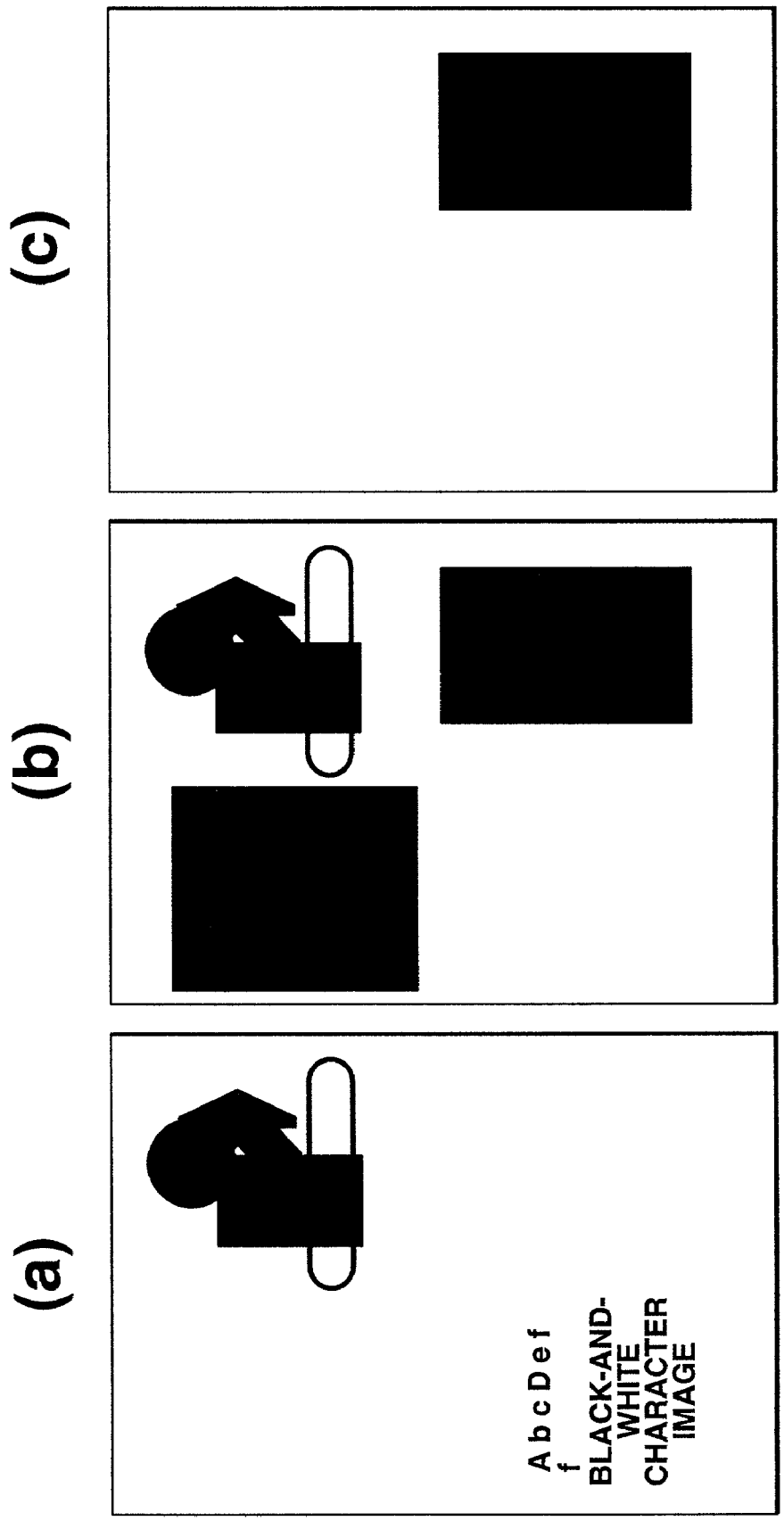
FIG. 9 is a diagram for explaining of combining the attribute information with the attribute flag data.

FIG. 8 shows image data which combine the image in FIG. 2 with the image in FIG. 5 pixel by pixel and the combined image data is stored in first image memory 105. FIG. 9 shows image data which combine the attribute flag data in FIG. 4 with the attribute information in FIG. 7 pixel by pixel like FIG. 8. The attribute information in FIG. 7 is overwritten on three kinds of flags (the character flag, the color flag and the halftone dots flag).

FIG. 9(a) is a combination of the graphic attribute in FIG. 7(a) and FIG. 4(a). FIG. 9(b) is a combination of the color attribute in FIG. 7(b) and FIG. 4(b). FIG. 4(a) includes the character flag and the color graphic image frequently has the same feature as character, for example both a character and a graphic image are drawn by thin lines and need sharpness. Therefore, the color graphic image in this embodiment is performed by the same process as a character is. Since the image forming apparatus in this embodiment combines the attribute flag data of the scanned image and the attribute information of the PDL image considering a kind of feature, the image forming apparatus does not ordinary need memories for storing the attribute flag data and the attribute information separately and reduces circuit size.

It is possible to hold a memory storing the graphic attribute and a memory storing the character flag separately and to perform more suitable image process for both a graphic portion and a character portion by performing one specific control for the graphic portion and another control for the character portion. Since all data in FIG. 7(c) are "0", FIG. 9(c) is the same as FIG. 4(c).

After the above-mentioned combination process, output image processing unit 116 performs image processes for the image stored in first image memory 105 based on combined image attributes. For instance, output image processing unit 116 performs to emphasize a high frequency component of a character portion in the image and sharpness of the character portion. On the other hand output image processing unit 116 performs low-pass filter process for a halftone dot portion to eliminate moire component. The above-mentioned processes can be changed by the feature information stored in first flag memory 106.

[Storage of Image Data]

The image data and the feature information which have temporarily been stored are compressed by data compression unit 109 and stored in storage device 110. It is desirable that storage device 110 is a storage medium such as a semiconductor medium which can be accessed at a high speed. In data compression unit 109 different data compressing processes are performed to the image data and the feature information, respectively. That is, it is desirable that a high efficiency compressing process such as JPEG compression such as to make deterioration of the image inconspicuous is performed to the image data in consideration of the human visual characteristics although such a process is irreversible. On the other hand, it is preferable to use a reversible compress method such as a JBIG compression to the feature information because a dropout or change of the feature information does not occur. The reduction of data amount using the proper compressing method according the kind of data can be realized by such a construction.

In this manner, the image data and the feature information to which the different compressing processes have been performed are stored in storage device 110 on a page unit basis of the original. There is also a case where the stored data is written into auxiliary storage device 111. As auxiliary storage device 111, it is preferable to use a medium such as a hard disk in addition to strange device 110, the original images of a number of pages can be efficiently stored and accumulated.

[Reading of Image Data]

The image data and the feature information stored in storage device 110 or auxiliary storage device 111 are read out in order to output them from a printer interface 117, the compression data is decompressed by data decompression unit 112, and they are written into second image memory 114 and second flag memory 115, respectively.

[Output of Image Data]

When the image data and the feature information temporarily stored in second image memory 114 and second flag memory 115 reach a predetermined size, they are transferred to output image process unit 116. The output image process unit 116 executes well-known image processes for print outputting the RGB image data, namely, a luminance density conversion, a RGB>CMYK conversion, a gamma correction, a binarizing process, and the like, and transfers the processed data to printer 117. On the basis of the transferred image signal of CMYK, printer 117 drives the semiconductor laser, and forms and outputs a visible image onto the transfer paper by well-known procedure.

The feature information stored in second flag memory 115 is used for switching the processes which are executed in output image processing unit 116. That is, by making coefficients of the RGB>CMYK conversion different in the photograph area and the character area, image quality of the output image can be improved. For example, conversion coefficients such that only black toner (that is, in the case where the image data is achromatic color, coefficients such that C, M, Y=0) are applied to the pixels in the character area and a black-and-white area, namely, is a black area in FIG. 9(a) (the character flag=1) and white area in FIG. 9(b) (the color flag=0). It is possible to prevent image deterioration caused by both printing black character including C, M and Y toner and misregistration of printing C, M and Y toner.

Coefficients such that even in case of the achromatic color, C, M, Y, 0 and deep black can be reconstructed can be applied to the other area.

In the binarizing process, the C, M, Y and K signals are converted into binary signals of 0 or 1 by using a well-known error diffusion process or dither process. However, since priority is giving to a sharpness of an output image in the character area or graphic area at this time, an error diffusion process is applied. Since importance is attached to a gradation in the photograph or halftone dot area, the dither process is applied. By switching the contents of the binarizing process in accordance with the feature information in this manner, the picture quality of the output image can be improved. Preferable image is selected in this embodiment. For example, good reproduction of a color graphic portion regarded as character portion is realized by using color and back toner and preservation of sharpness for thin lines by performing the error diffusion process.

Figure 6:
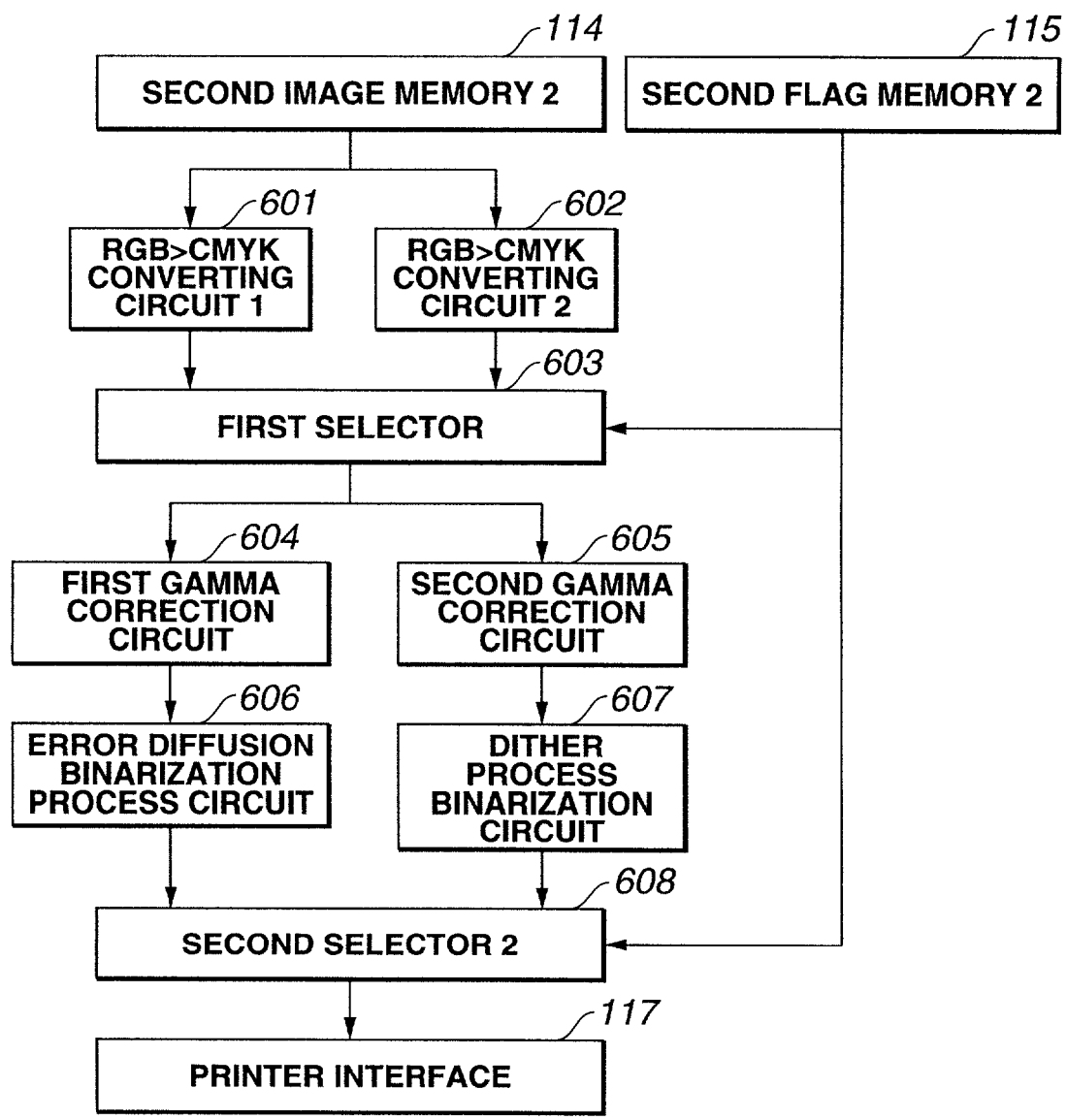
FIG. 6 is a block diagram of an output image processing construction of this invention.

FIG. 6 shows an example of a constructional block diagram for such processes. Second image memory 115 and printer interface 117 are the same as those in FIG. 1. The color image data of RGB read out from second image memory 114 are inputted in parallel to RGB>CMYK converting circuits 601 and 602 and independently converted into C, M, Y and K image signals, respectively. One of outputs of RGB>CMYK converting circuits 601 and 602 is selected by first selector 603 in accordance with the feature information in second flag memory 115. Conversion coefficients for the character area have been set in RGB>CMYK converting circuit 601 and coefficients other than the conversion coefficients for the character area have been set in RGB>CMYK converting circuit 602. The output of RGB>CMYK converting circuit 601 is selected when the character flag in second flag memory 115 is equal to 1. The output of RGB>CMYK converting circuit 602 is selected when the character flag=0. (When the character flag=1 and the color flag=0, only Bk toner is printed as the above-mentioned.)

An output of first selector 603 is separated in parallel into two systems. One of them passes through first gamma correction circuit 604 and error diffusion binarization process circuit 606 and is inputted as a binary CMYK signal to second selector 608. The other of them passes through second gamma correction circuit 605 and dither process binarizing circuit 607 and is also inputted as a binary CMYK signal to second selector 608.

Second selector 608 selects an output of either error diffusion process unit 606 or dither process unit 607 and transfers it to printer interface 117. Since the error diffusion process is selected for the character area and graphic area here, when the character flag=1 or halftone dot flag=1, second selector 608 selects the output of the error diffusion process unit 606. In the other case, second selector selects the output of dither process unit 607.

[Second Embodiment]

When the inputted PDL image and the scanned image are combined, the attribute flag data and the attribute information is regarded as the same feature in first embodiment. However, it is possible to manage each feature information separately for performing the optimum image processing to each pixel.

Figure 11:
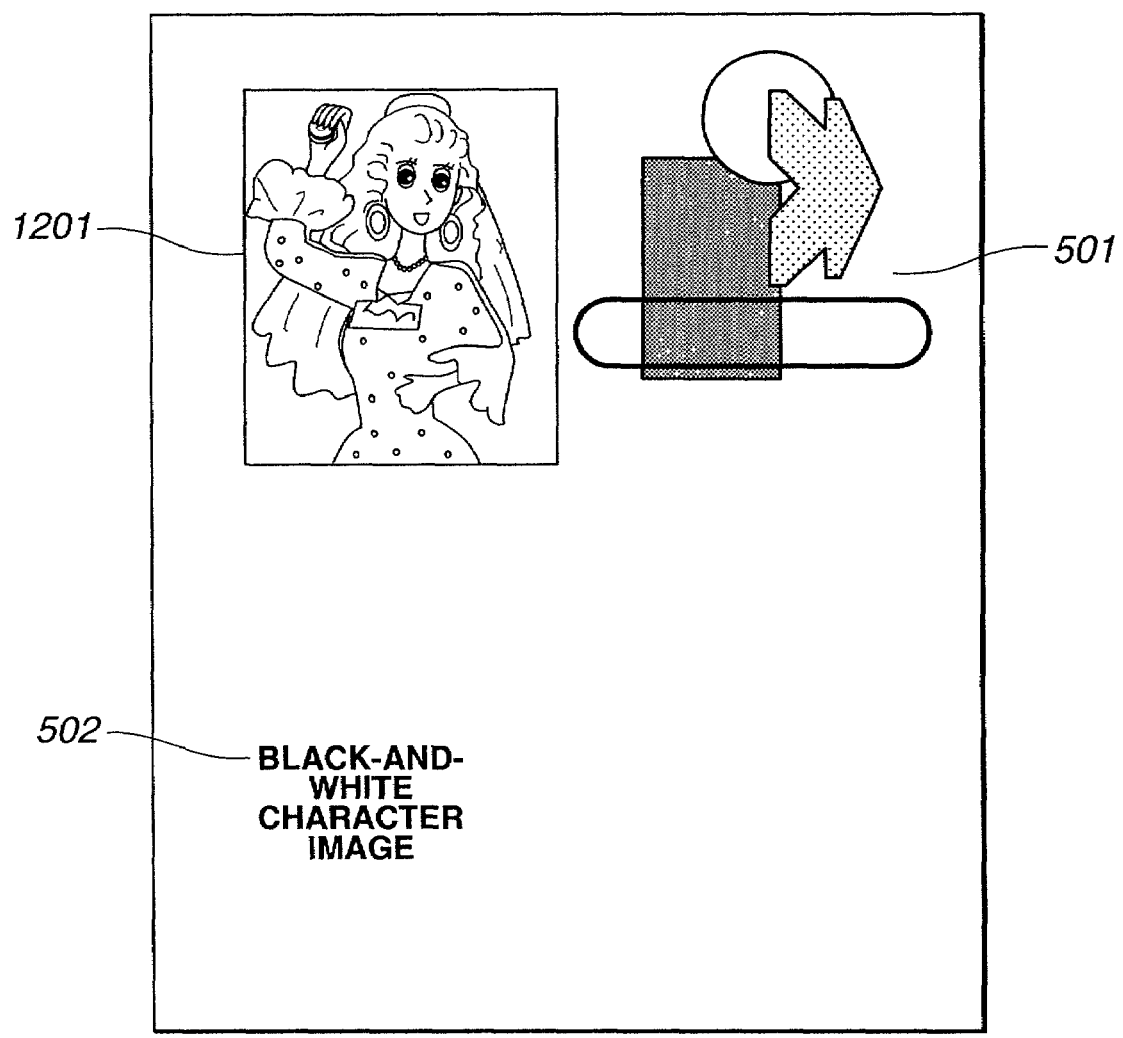
FIG. 11 is an example of PDL image data in the second embodiment.
Figure 12:
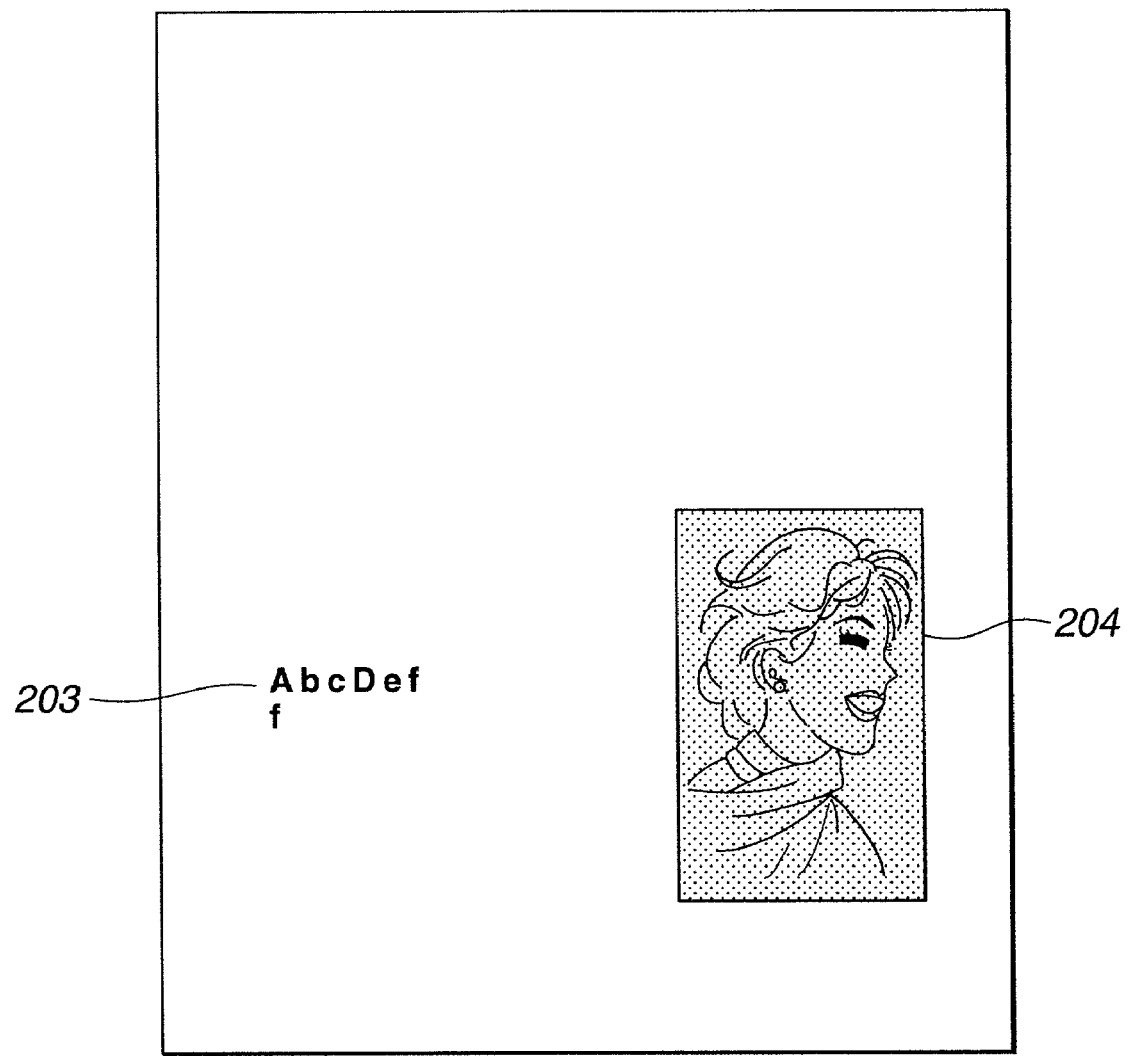
FIG. 12 is an example of a scanned image data in the second embodiment.
Figure 13:
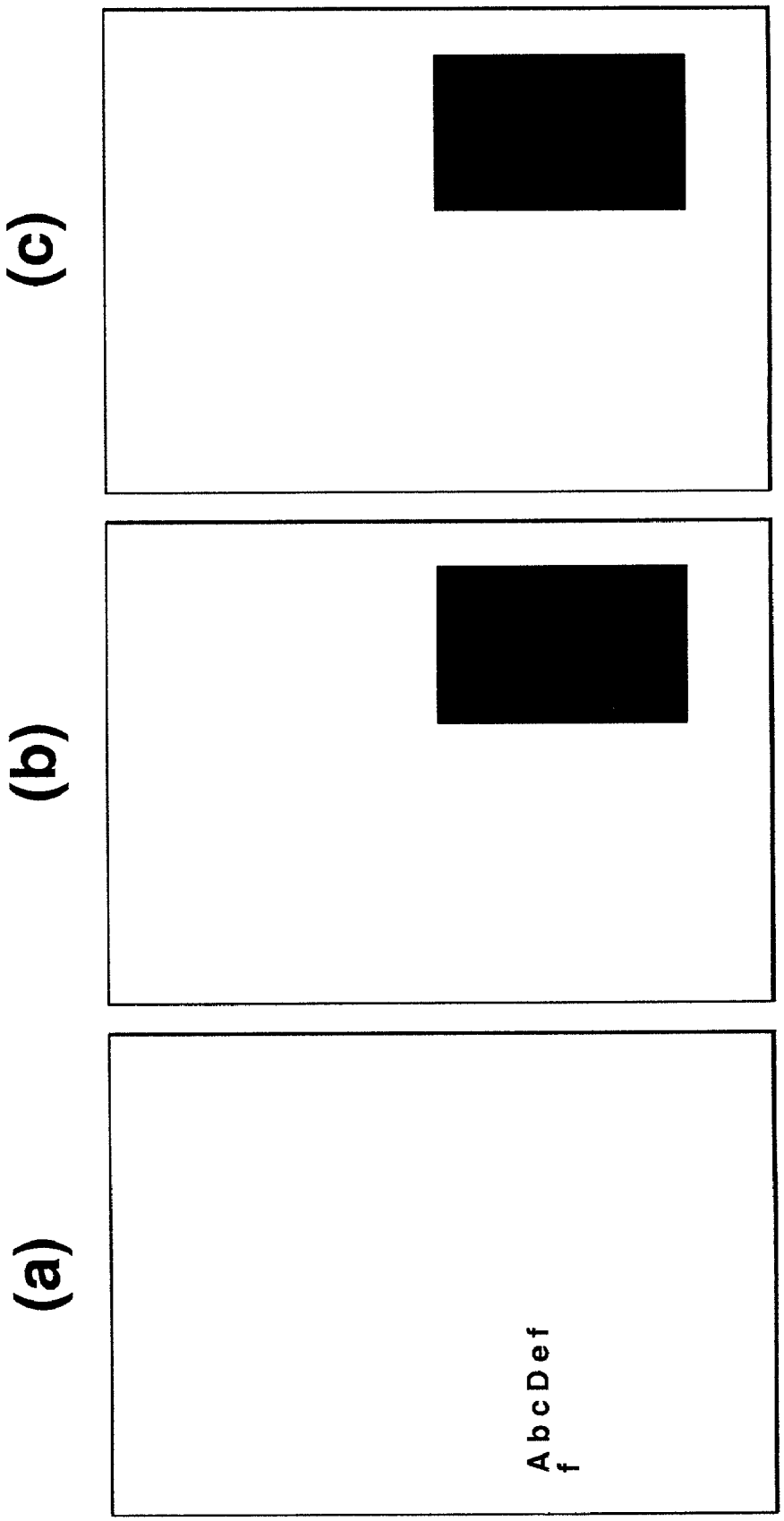
FIG. 13 is a diagram for explaining attribute flag data representing features of the scanned image.

FIG. 12 shows scanned image data and FIG. 11 shows PDL image data in this embodiment. FIG. 13 is a diagram showing the attribute flag data which is generated by an image area dividing process of the scanned image data in FIG. 12. FIG. 13(*a*) shows a character flag. FIG. 13(*b*) shows a color flag and FIG. 13(*c*) shows a halftone dots flag like FIG. 4. Black character portion 203 and halftone image potion 204 including color information are reflected in FIGS. 13(*a*), (*b*) and (*c*).

Figure 14:
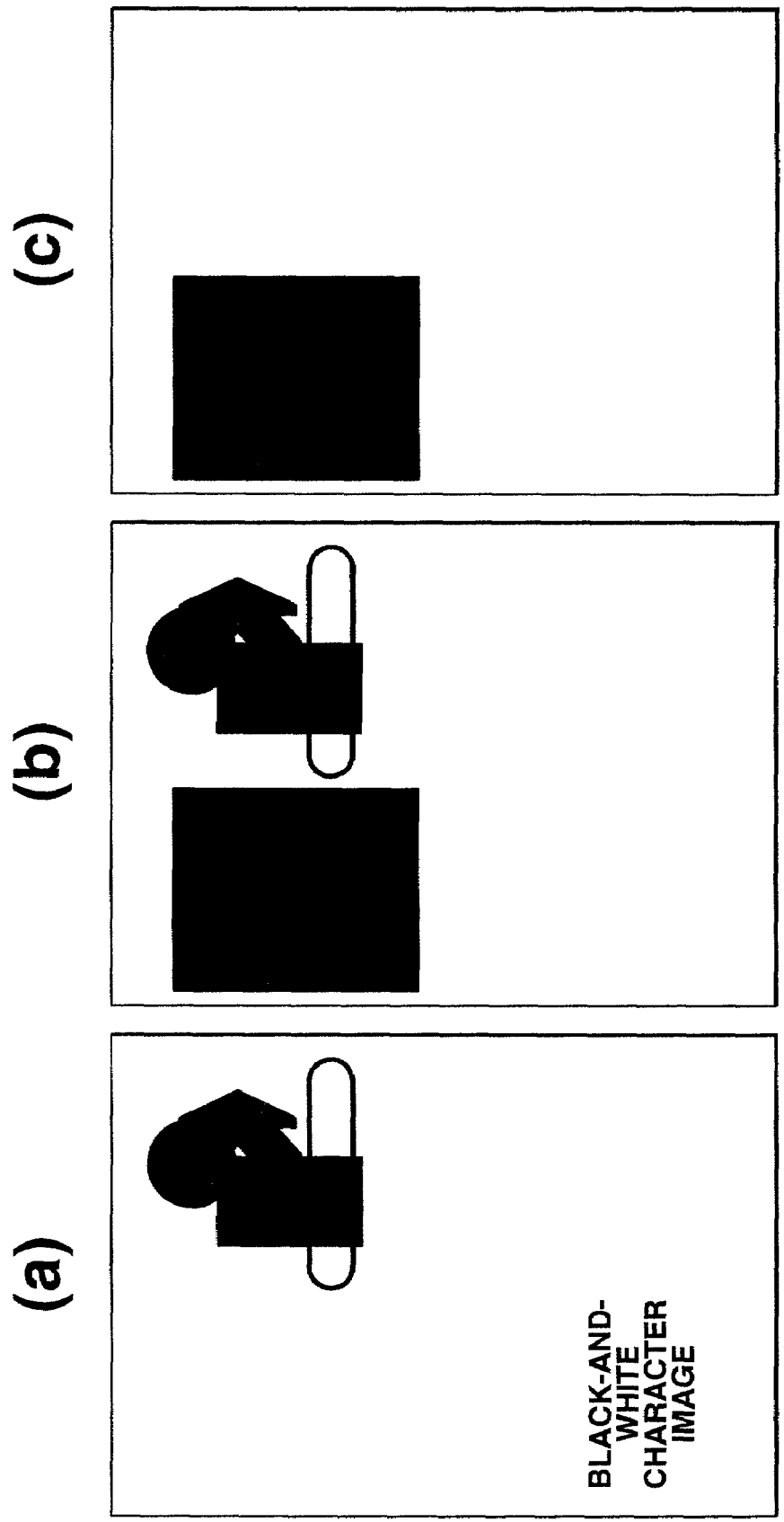
FIG. 14 is a diagram of explaining attribute information representing features of the PDL image data.

FIG. 14 shows attribute information of the PDL image data in FIG. 11. FIG. 14(*a*) shows a graphic attribute. FIG. 14(*b*) shows a color attribute and FIG. 14(*c*) shows nature image attribute. Since 1201 in FIG. 11 is a bitmap image portion including color information, the bitmap image portion is reflected in FIGS. 14(*b*) and (*c*). Color graphic portion 501 and black character portion 502 are reflected in FIGS. 14(*a*) and (*b*) as the attribute information like first embodiment.

FIGS. 15(*a*), (*b*) and (*c*) show the composition of the attribute flag in FIG. 13 and the attribute information in FIG. 14 and FIG. 15(*d*) indicates PDL image attribute. The attribute in FIG. 15(*d*) is the PDL image attribute. The black area in FIG. 15(*d*) (where PDL image flag=1) is the area of the PDL image, the other area (where white in FIG. 15(*d*) and PDL image flag=0) is the area of the scanned image.

The following binarizing processes are used in the first embodiment. That is to say, C, M, Y and K signals are converted to binarized signals (0 or 1) by using well-known error diffusion process or dither process. In this process, image signals of a character area and halftone dot area taking priority for sharpness are processed by an error diffusion process and image signals of a photo area, where gradation is important, are processed by a dither process.

If dither process were used in halftone dot area, the resolution of the dither process and the resolution of the scanned halftone dot image would cause interference. Since interference patterns (called moiré) generates in the image and degrades it, an error diffusion process is applied taking priority for sharpness. However, to use the dither process for bitmap image data in a natural image including a PDL image is regarded as good for taking priority for gradation in many cases. Therefore, if a pixel is in the black area in FIG. 15(*c*), an image processing for the pixel needs to be changed on the basis of judging whether a pixel is in the PDL image or the scanned image. If a pixel is in the black area in FIG. 15(*c*) and is not a PDL image area in FIG. 15(*d*), the pixel is regarded as a pixel of the halftone dot image and performed the error diffusion process is performed. If a pixel is in the black area in FIG. 15(*c*) and is a PDL image area in FIG. 15(*d*), the pixel is regarded as a pixel of the bitmap image and the dither process is performed. As a result, it is possible to perform the most suitable image processing for each an image area.

In a case where the most suitable image processing based on the feature information (the attribute information and the attribute flag data) is different for each of the PDL image and the scanned image for the reason above-mentioned, the most suitable image processing can be performed for each image area by using information to determine if a processed pixel is in the PDL image or the scanned image.

When the PDL image data and the scanned image data are combined, the feature information to perform the most suitable image process is also combined. The feature information of the PDL image data are the attribute information including the graphic attribute, the color attribute and the nature image attribute. The feature information of the scanned image data are the attribute flag data including the character flag, the color flag and the halftone dot flag. When the above-mentioned image processing apparatus combines the PDL image with the scanned image, the image processing apparatus also combines attribute information of the PDL image with the attribute flag data of the scanned image.

As a result, it is possible to perform the most suitable image process for each combined image data by using the same image processing unit and avoid using two image processing units.

Furthermore, if the image processing apparatus performed the most suitable process for the PDL image and the scanned image before combining the images, the image processing apparatus would process two images and needs much time to do it. However, since the image processing apparatus performs the most suitable process for the combined image, the image processing apparatus can avoid wasting a process time.

[Third Embodiment]

The objects of the present invention can also be achieved by providing a storage medium storing program codes for performing the aforesaid processes in a system or an apparatus, reading the program codes from the storage medium using a computer (e.g., CPU, MPU) of the system or apparatus and then executing the program.

In this case, the program codes read from the storage medium realize the functions according to the previous embodiments.

Further, the storage medium, such as a floppy disk, hard disk, optical disk, magneto-optical disk, CD-ROM, CD-R, magnetic tape, non-volatile type memory card, or ROM, can be used for providing the program codes.

Furthermore, besides the aforesaid functions according to the above embodiments being realized by executing the program codes which are read by a computer, the present invention includes a case where an Operating System (OS) or the like working on the computer performs a part of or the entire process in accordance with designations of the program codes and realizes the functions according to the above embodiments.

The invention may be embodied in the other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image processing apparatus comprising:
   inputting means for inputting image data described by a command correspond to each part of an image;
   interpreting means for interpreting the command to form a bitmap image and to output an attribute information;
   scanning means for scanning an original image to output color image data;
   generating means for generating flag data indicating attributes of the original image based on color image data;
   first combining means for combining the color image data and the bitmap image; and
   second combining means for combining the flag data and the attribute information of the command.

2. An image processing apparatus according to claim 1, wherein said flag data includes a character flag, a color flag and a halftone dots flag.

3. An image processing apparatus according to claim 1, wherein the attributes of the image is generated based on a change amount of the color image data.

4. An image processing apparatus according to claim 1, wherein an image processing is performed for the color image data based on the flag data.

5. An image processing apparatus according to claim 1, wherein attribute information of the command includes graphic attribute, color attribute, natural image attribute and PDL image attribute.

6. An image processing apparatus according to claim 1, wherein a combining method of the first combining means is the same as a combining method of the second combining means pixel by pixel.

7. An image processing apparatus according to claim 1, wherein the second combining means combines a character flag of the flag data and a graphic attribute of the attribute information.

8. An image processing apparatus according to claim 1, wherein a combining result of the first combining means is compressed by using one compression method and a combining result of the second combining means is compressed by using another compression method, and wherein the compressed results are stored a storage device.

9. An image processing apparatus according to claim 8, wherein the combining result of the first combining means is compressed by using a irreversible compression method and the combining result of the second combining means is compressed by using a reversible compression method.

10. An image processing apparatus according to claim 1, wherein at least one of a color space conversion unit and binarizing processing unit for the combined image is controlled by the result of the second combining means.

11. An image processing apparatus according to claim 10, wherein when a portion is regarded as a character area and a black-and-white area by considering the result of the second combination means, the color space conversion unit converts the image data correspond to the portion by using coefficient of only black.

12. An image processing apparatus according to claim 10, wherein when a portion is regarded as a character area or a halftone dot area by considering the result of the second combination means, the binarizing processing unit binarizes the image data correspond using an error diffusion method.

13. An image processing apparatus according to claim 10, wherein when a portion is regarded as a PDL image area and a natural image area by considering the result of the second combining means, the binarizing processing unit binarizes the image data using dither processing, when a portion is regarded as not to be a PDL image area and to be a halftone dot area by considering the result of the second combining means, the binarizing processing unit binarizes the image data using an error diffusion processing.

14. An image processing apparatus according to claim 10, wherein when a portion is regarded as a character area by considering the result of the second combining means, sharpness processing is applied to the image data correspond the portion.

15. An image processing apparatus according to claim 10, wherein when a portion is regarded as a halftone dot area by considering the result of the second combination means, low-pass filter processing is applied to the image data correspond the portion.

16. An image processing method comprising:
   inputting image data described by a command corresponding to each part of an image;
   interpreting the command to form a bitmap image and to output attribute information;
   scanning an original image to output color image data;
   generating flag data indicating attributes of the original image based on color image data;
   combining the color image data and the bitmap image; and combining the flag data and the attribute information of the command.

17. A computer program product, comprising a computer readable medium having computer program codes, said product including:
   code for inputting image data described by a command correspond to each part of an image;
   code for interpreting the command to form a bitmap image and to output attribute information;
   code for scanning an original image to output color image data;
   code for generating flag data indicating attributes of the original image based on color image data;
   code for combining the color image data and the bitmap image; and
   code for combining the flag data and the attribute information of the command.

18. An image processing apparatus comprising:
   an interface unit arranged to input image data described by a command corresponding to each part of an image;
   an interpret unit arranged to interpret the command to form a bitmap image and to output attribute information;
   a scanner unit arranged to scan an original image to output color image data;
   a generating unit arranged to generate flag data indicating attributes of the original image based on color image data;
   a first combine unit arranged to combine the color image data and the bitmap image; and
   a second combine unit arranged to combine the flag data and the attribute information of the command.

19. An image processing apparatus according to claim 18, wherein said flag data includes a character flag, a color flag and a halftone dots flag.

20. An image processing apparatus according to claim 18, wherein the attributes of the image are generated based on a change amount of the color image data.

21. An image processing apparatus according to claim 18, wherein the color image data is processed based on the flag data.

22. An image processing apparatus according to claim 18, wherein attribute information of the command includes graphic attribute, color attribute, natural image attribute and PDL image attribute.

23. An image processing apparatus according to claim 18, wherein a combining method of the first combine unit is the same as a combining method of the second combine unit pixel by pixel.

24. An image processing apparatus according to claim 18, wherein the second combine unit is arranged to combine a character flag of the flag data and a graphic attribute of the attribute information.

25. An image processing apparatus according to claim 18, wherein a combining result of the first combine unit is compressed by using one compression method and a combining result of the second combine unit is compressed by using another compression method, and wherein the compressed results are stored a storage device.

26. An image processing apparatus according to claim 25, wherein the combine result of the first combine unit is compressed by using a irreversible compression method and the combining result of the second combining unit is compressed by using a reversible compression method.

27. An image processing apparatus according to claim 18, wherein at least one of a color space conversion unit and binarizing processing unit for the combined image is controlled by the result of the second combining unit.

28. An image processing apparatus according to claim 18, wherein when a portion is regarded as a character area and a black-and-white area by considering the result of the second combination unit, the color space conversion unit converts the image data corresponding to the portion to data by using coefficient of only black.

29. An image processing apparatus according to claim 28, wherein when a portion is regarded as a character area or a halftone dot area by considering the result of the second combination unit, the binarizing processing unit binarizes the image data using an error diffusion method.

30. An image processing apparatus according to claim 28, wherein when a portion is regarded as a PDL area and a natural image area by considering the result of the second combine unit, the binarizing processing unit binarizes the image data using dither processing and when a portion is regard as not to be a PDL area and to be a halftone dot area by considering the result of the second combine unit, the binarizing processing unit binarizes the image data using an error diffusion processing.

31. An image processing apparatus according to claim 28, wherein when an portion is regarded as a character area by considering the result of the second combine unit, sharpness process is applied to the image data of the corresponding portion.

32. An image processing apparatus according to claim 28, wherein when an portion is regarded as a halftone dot area by considering the result of the second combine unit, low-pass filter processes is applied to the image data corresponding to the portion.

33. An image processing apparatus comprising:
   data inputting means for inputting image data, through an interface, described by a command correspond to each part of an image;
   interpreting means for interpreting the command to form a bitmap image and to output attribute information;
   scanning means for scanning an original image as digital signals pixel by pixel;
   storing means for storing the scanned digital signals;
   area discriminating means for discriminating areas based on characters of the original image;
   feature data storing means for storing attribute flag data, indicating attributes of the image based on a digital signal,
   wherein the bitmap image is combined with the scanned digital signal on image storing means, and the attribute information of the command is also combined with the attribute flag data on feature data storing means.

34. An image processing apparatus according to claim 33, wherein the attribute flag data includes PDL image flag which is information to determine image data correspond to the PDL, and wherein flag data is the scanned digital signal or image data described by the command.

35. An image processing apparatus according to claim 34, wherein an image processing is performed for the combined bitmap image and the scanned image signal; and wherein the image processes or parameters for the image process are changed based on the combined attribute information, the attribute flag data and the PDL flag data.

36. An image processing apparatus according to claim 33, wherein an image processing is performed for the combined bitmap image and the scanned image signal; and wherein the image processes or parameters for the image process are changed based on the combined attribute information and the attribute flag data.

* * * * *

UNITED STATES PATENT AND TRADEMARK OFFICE
CERTIFICATE OF CORRECTION

PATENT NO. : 6,977,754 B2
APPLICATION NO. : 09/878943
DATED : December 20, 2005
INVENTOR(S) : Atsushi Matsumoto et al.

It is certified that error appears in the above-identified patent and that said Letters Patent is hereby corrected as shown below:

Title page,
Item [57], ABSTRACT,
Line 7, "include" should read -- includes --.

Drawings,
Sheet 1, Figure 1, "MEMROY" should read -- MEMORY --; "PRIVITER" should read -- PRINTER --; "VASTER" should read -- RASTER --; "STRAGE DEVICE" [label 110] should read -- STORAGE DEVICE --; "ANXILIARY STRAGE" should read -- AUXILIARY STORAGE --.
Sheet 10, Fig. 10, "DVELOPIN" should read -- DEVELOPING --; "f-THET" should read -- f-THETA --; "FIKING" should read -- FIXING --.

Column 1,
Line 37, "imaged" should read -- image --.

Column 2,
Line 18, "an" should read -- a --.
Line 67, "correspond" should read -- corresponding --.

Column 3,
Line 14, "an" should read -- a --.
Line 27, "correspond" should read -- corresponding --.

Column 4,
Line 25, "correspond" should read -- corresponding --.
Line 32, "comprised" should read -- comprising --.
Line 35, "mirror 1007 and 1008 is" should read -- mirrors 1007 and 1008 are --.
Line 54, "are" should read -- is --.

Column 5,
Line 14, "more" should read -- in more --.

Column 6,
Line 1, "the" should be deleted.
Line 14, "character" should read -- characters --.
Line 19, "halftone dots area appears" should read -- the halftone dots appears with --.

UNITED STATES PATENT AND TRADEMARK OFFICE
CERTIFICATE OF CORRECTION

PATENT NO. : 6,977,754 B2
APPLICATION NO. : 09/878943
DATED : December 20, 2005
INVENTOR(S) : Atsushi Matsumoto et al.

It is certified that error appears in the above-identified patent and that said Letters Patent is hereby corrected as shown below:

Column 7,
Line 9, "first" should read -- in the first --.
Line 23, "back" should read -- black --.
Line 50, "ordinary" should read -- ordinarily --.

Column 8,
Line 21, "the" (second occurrence) should read -- to the --.
Line 29, "strange" should read -- storage --.

Column 9,
Line 7, "giving" should read -- given --.
Line 17, "back" should read -- black --.

Column 10,
Line 42, "performed" should be deleted.
Line 47, "an" should be deleted.
Line 62, "are" should read -- is --.

Column 11,
Line 47, "correspond" should read -- corresponding --.
Line 63, "is" should read -- are --.

Column 12,
Line 18, "a" should read -- in a --.
Line 21, "a" should read -- an --.
Line 32, "correspond" should read -- corresponding --.
Line 38, "image data correspond" should read -- corresponding image data --.
Lines 51 and 57, "correspond" should read -- corresponding to --.

Column 13,
Line 7, "correspond" should read -- corresponding --.
Line 57, "a" should read -- in a --.
Line 59, "the combine" should read -- the combining --.

UNITED STATES PATENT AND TRADEMARK OFFICE
CERTIFICATE OF CORRECTION

PATENT NO. : 6,977,754 B2
APPLICATION NO. : 09/878943
DATED : December 20, 2005
INVENTOR(S) : Atsushi Matsumoto et al.

It is certified that error appears in the above-identified patent and that said Letters Patent is hereby corrected as shown below:

Column 14,
Lines 22 and 27, "an" should read -- a --.
Line 29, "is" should read -- are --.
Lines 33 and 50, "correspond" should read -- corresponding --.

Signed and Sealed this

Eleventh Day of July, 2006

JON W. DUDAS
*Director of the United States Patent and Trademark Office*